United States Patent
Kim et al.

(10) Patent No.: US 11,765,425 B2
(45) Date of Patent: Sep. 19, 2023

(54) BROADCAST RECEIVING DEVICE, METHOD FOR PROVIDING MOVING IMAGE ZAPPING ADVERTISEMENTS THEREOF, AND SYSTEM PROVIDING MOVING IMAGE ZAPPING ADVERTISEMENTS

(71) Applicant: ZAPPLE INC., Seoul (KR)

(72) Inventors: Jong Soo Kim, Seoul (KR); Tae Yong Park, Yongin-si (KR); Dong Hyun Ku, Seoul (KR)

(73) Assignee: ZAPPLE INC., Seoul (KR)

( * ) Notice: Subject to any disclaimer, the term of this patent is extended or adjusted under 35 U.S.C. 154(b) by 0 days.

(21) Appl. No.: 17/282,605

(22) PCT Filed: Jun. 4, 2020

(86) PCT No.: PCT/KR2020/007264
§ 371 (c)(1),
(2) Date: Apr. 2, 2021

(87) PCT Pub. No.: WO2021/172660
PCT Pub. Date: Sep. 2, 2021

(65) Prior Publication Data
US 2022/0150580 A1    May 12, 2022

(30) Foreign Application Priority Data
Feb. 28, 2020    (KR) .................... 10-2020-0024796

(51) Int. Cl.
*H04N 21/44* (2011.01)
*H04N 21/438* (2011.01)
*H04N 21/81* (2011.01)

(52) U.S. Cl.
CPC ... *H04N 21/44016* (2013.01); *H04N 21/4383* (2013.01); *H04N 21/812* (2013.01)

(58) Field of Classification Search
CPC ......... H04N 21/44016; H04N 21/4383; H04N 21/812; H04N 21/44222; H04N 21/482; H04N 21/23424; H04N 21/4316
See application file for complete search history.

(56) References Cited

U.S. PATENT DOCUMENTS 5,786,845 A * 7/1998 Tsuria ............... H04N 21/4112
725/32
5,907,321 A * 5/1999 Grossman .......... H04N 21/6543
725/132
(Continued)

FOREIGN PATENT DOCUMENTS

EP    2858375 A1    4/2015
EP    3383056 A1    10/2018
(Continued)

OTHER PUBLICATIONS

Danieal Belanche et al., "Understanding Interactive Online Advertising: Congruence and Product Involvement in Highly and Lowly Arousing, Skippable Video Ads", Journal of Interactive Marketing, 2017, vol. 37, pp. 75-88.

*Primary Examiner* — John R Schnurr
(74) *Attorney, Agent, or Firm* — Bridgeway IP Law Group, PLLC; Sang Ho Lee; Hyun Woo Shin

(57) ABSTRACT

A broadcast receiving apparatus according to an embodiment of the disclosure includes: a broadcast contents processing unit which is configured to request, when receiving a channel switching signal, broadcast contents of a switched channel and to display the transmitted broadcast contents of the switched channel on a first plane; a zapping advertisements processing unit which is configured to request a moving image zapping advertisement corresponding to the switched channel from a zapping advertisements server and to displays the received moving image zapping advertisement on a first plane; and a screen control unit which is (Continued)

configured to display the broadcast contents of the switched channel on the first plane after the moving image zapping advertisement is finished.

4 Claims, 8 Drawing Sheets

(56) References Cited

U.S. PATENT DOCUMENTS

| | | | | |
|---|---|---|---|---|
| 7,237,251 | B1* | 6/2007 | Oz | H04N 21/4384 725/100 |
| 9,100,691 | B2* | 8/2015 | Seo | H04N 21/4384 |
| 9,609,394 | B2* | 3/2017 | Kim | H04N 21/812 |
| 2002/0042914 | A1* | 4/2002 | Walker | H04H 60/73 725/32 |
| 2005/0028202 | A1* | 2/2005 | Lee | H04N 21/4383 348/731 |
| 2009/0106792 | A1* | 4/2009 | Kan | H04N 21/472 725/34 |
| 2009/0222851 | A1* | 9/2009 | Talmi | H04N 21/812 725/32 |
| 2009/0239514 | A1* | 9/2009 | Kenagy | H04N 21/44204 455/414.3 |
| 2011/0088061 | A1* | 4/2011 | Rowe | H04N 21/2668 725/35 |
| 2011/0265117 | A1* | 10/2011 | Cha | H04H 60/32 725/35 |
| 2013/0276005 | A1 | 10/2013 | Kim | |
| 2014/0096155 | A1* | 4/2014 | Kim | G06Q 30/0241 725/32 |
| 2015/0089538 | A1* | 3/2015 | Kim | H04N 21/431 725/32 |
| 2015/0326945 | A1* | 11/2015 | Johnson | H04N 21/472 725/32 |
| 2017/0118513 | A1* | 4/2017 | Pati | H04N 21/44222 |
| 2017/0171620 | A1* | 6/2017 | Oren | H04N 21/44226 |
| 2020/0196003 | A1* | 6/2020 | Bundi | H04N 21/4622 |

FOREIGN PATENT DOCUMENTS

| | | |
|---|---|---|
| JP | 2013-055638 A | 3/2013 |
| JP | 2018-532281 A | 11/2018 |
| KR | 10-2013-0018464 A | 2/2013 |
| KR | 10-1280806 B1 | 7/2013 |
| KR | 10-1706606 B1 | 2/2017 |
| KR | 10-2019-0132979 A | 11/2019 |

* cited by examiner

BROADCAST RECEIVING DEVICE, METHOD FOR PROVIDING MOVING IMAGE ZAPPING ADVERTISEMENTS THEREOF, AND SYSTEM PROVIDING MOVING IMAGE ZAPPING ADVERTISEMENTS

BACKGROUND

1. Field

The disclosure relates to a broadcasting receiving apparatus for providing moving pictures zapping advertisements, a method for providing zapping advertisements thereof, and a system for providing moving pictures zapping advertisements.

2. Description of Related Art

Digital broadcasting refers to a broadcasting that compresses a broadcasting signal into a digital form and transmits the compressed digital signal, unlike the conventional analog broadcasting. In an analog broadcasting, only one image was carried per each radio wave, and audio had to be transmitted using another radio wave. However, a digital broadcasting may carry a plurality of images or voices on one radio wave, and may compress information without degrading the quality.

The digital broadcast may provide a broadcast program with a clear quality on one hand, and may use various contents such as shopping, gaming, internet surfing, etc. on the other hand.

Meanwhile, a user may find desired content among various broadcast programs or contents, or may switch channels from the channel currently watching to another channel. Here, such channel switching action is referred to as zapping. Since the digital broadcast receives a compressed signal, it takes time to receive, decompress, and process a broadcast signal corresponding to the switched channel. Therefore, a time gap in which no broadcast program or content is normally displayed may occur depending on the signal processing.

Further, in recent years, a moving image advertisement has been actively performed on various platforms in addition to digital broadcast, and in the case of digital broadcast, the needs for other types of moving image advertisements that may create new profits in addition with the existing moving image advertisements provided between programs.

SUMMARY

The disclosure provides a broadcast receiving apparatus, a method for providing moving image zapping advertisements with such an apparatus, and a system for providing moving image zapping advertisements, all of which efficiently provide zapping advertisements without occupying memory of the broadcast receiving apparatus by displaying the moving image zapping advertisement through streaming during the channel switching time.

The disclosure provides a broadcast receiving apparatus, a method for providing moving image zapping advertisements with such an apparatus, and a system for providing moving image zapping advertisements, all of which may effectively provide various additional information for an advertisement for a short period of time by providing a moving image zapping advertisement which may maximize the advertising effect of an advertiser.

The disclosure provides a broadcast receiving apparatus, a method for providing a moving image zapping advertisement with such an apparatus, and a system for providing moving image zapping advertisements, all of which are capable of providing a user with a moving image zapping advertisement without a sense of discomfort, since the user does not have to watch the moving image zapping advertisement and skip the moving image zapping advertisement while the moving image zapping advertisement is being displayed, thereby securing channel switching time and allowing the broadcast contents be directly output.

In order to solve these problems, there is provided a broadcast receiving apparatus, according to one embodiment of the disclosure, including: a broadcast contents processing unit configured to request, when receiving a channel switching signal, broadcast contents of the switched channel and to display the transmitted broadcast contents on a first plane; a zapping advertisements processing unit configured to request a moving image zapping advertisement corresponding to the switched channel from a zapping advertisement server and to display the received moving image zapping advertisement on the first plane; and a screen control unit configured to make the broadcast contents of the switched channel to be displayed on the first plane after the moving image zapping advertisement finishes.

Further, the zapping advertisements processing unit may further include: an advertisement DB for storing moving image zapping advertisements schedule information; and an advertisement control unit configured to request, if it is determined that the moving image zapping advertisement corresponding to the switched channel is scheduled as a result of checking the moving image zapping advertisement schedule information, the moving image zapping advertisement corresponding to the switched channel from the zapping advertisements server.

In addition, the screen control unit may control, when a signal for skipping the moving image zapping advertisement is received, to stop displaying the moving image zapping advertisement on the first plane via streaming and display broadcast contents of the switched channel on the second plane.

Further, the zapping advertisement processing unit may display a zapping advertisement on a second plane that is located visually lower than the first plane and is determined to be exposed according to whether or not the image is displayed on the first planes.

The first plane may be a video plane, and the second plane may be a background plane.

Further, when the moving image zapping advertisement is finished, log information of the finished moving image zapping advertisement may be transmitted to the zapping and advertising server.

A method for providing a moving image zapping advertisement in a broadcast receiving apparatus according to an embodiment of the disclosure may include steps of: requesting, in response to receiving a channel switching signal, broadcast contents of switched channel from the broadcast contents server, and requesting a moving image zapping advertisement corresponding to the switched channel from the zapping advertisement server; displaying the moving image zapping advertisement received from the zapping advertisement server on a first plane which is displaying broadcast contents of a previously set channel; and displaying, when the moving image zapping advertisement is finished, the broadcast contents of the switched channel received from the broadcast contents server on the first plane.

Further, the step of requesting the moving image zapping advertisement may include the steps of: checking moving image zapping advertisement schedule information; and if it is determined that the moving image zapping advertisement corresponding to the switched channel is scheduled as a result of checking, requesting the moving image zapping advertisement corresponding to the switched channel from the zapping advertisement server.

Further, the method may further include stopping the moving image zapping advertisement from being displayed via streaming on the first plane when a moving image zapping advertisement skipping signal is received.

Further, the method may include displaying a zapping advertisement on a second plane that is visually located below the first plane and is determined to be exposed according to whether the image is displayed on the first planes or not.

The first plane may be a video plane, and the second plane is a background plane.

The method may further include transmitting log information of the finished moving image zapping advertisement to the zapping advertisements server when the moving image zapping advertisement is finished.

A system for providing a moving image zapping advertisement according to an embodiment of the disclosure may include: a zapping advertisements server configured to transmit, when receiving a request according to a channel switching signal, a moving image zapping advertisement corresponding to a switched channel via streaming; and a broadcast receiving apparatus configured to: request the moving image zapping advertisement when receiving the channel switching signal; display the received moving image zapping advertisement on a first plane which is displaying broadcast contents of previously set channel; and display broadcast contents of the switched channel on the first plane when the moving image zapping advertisement is finished.

The zapping advertisement server may include: a moving image zapping advertisements DB for storing moving image zapping advertisements for providing during channel switching time of digital broadcast; a moving image zapping advertisement scheduling unit for scheduling and monitoring the moving image zapping advertisements for each channel of the digital broadcast; and a communication unit for transmitting, when a request according to a channel switching signal is received, the moving image zapping advertisement corresponding to a switched channel via streaming according to the moving image zapping advertising schedule information.

Further, when the moving image zapping advertisement is finished, the broadcast receiving apparatus may transmit log information of the finished moving image zapping advertisement to the zapping advertisements server, and the zapping advertisements server may reschedule the moving image zapping advertisement schedule information according to the transmitted moving image zapping advertisement log information, and transmit the rescheduled moving image zapping advertisement schedule information to the broadcast receiving apparatus.

The broadcast receiving apparatus, the method for providing moving image zapping advertisement, and the system for providing the moving image zapping advertisements according to the disclosure may provide the zapping advertisements efficiently without occupying the memory of the broadcast receiving apparatus by providing the moving image zapping advertisements via streaming during the channel switching time.

In addition, the broadcast receiving apparatus, the method for providing moving image zapping advertisement, and the system for providing a moving image zapping advertisement according to the disclosure may effectively provide various additional information to the advertisement for a short period of time to maximize the advertising effect of the advertiser by providing a moving image zapping advertising system capable of increasing advertising profit.

In addition, the broadcast receiving apparatus, the method for providing moving image zapping advertisement, and the system for providing the moving image zapping advertisement according to the disclosure do not force the viewer to watch the moving image zapping advertisement, and let the viewer skip the moving image zapping advertisement in the middle of its display, thereby ensuring the channel switching time and directly outputting the broadcast content, so that the user may provide the moving image zapping advertisements without discomfort.

DETAILED DESCRIPTION

Figure 1:
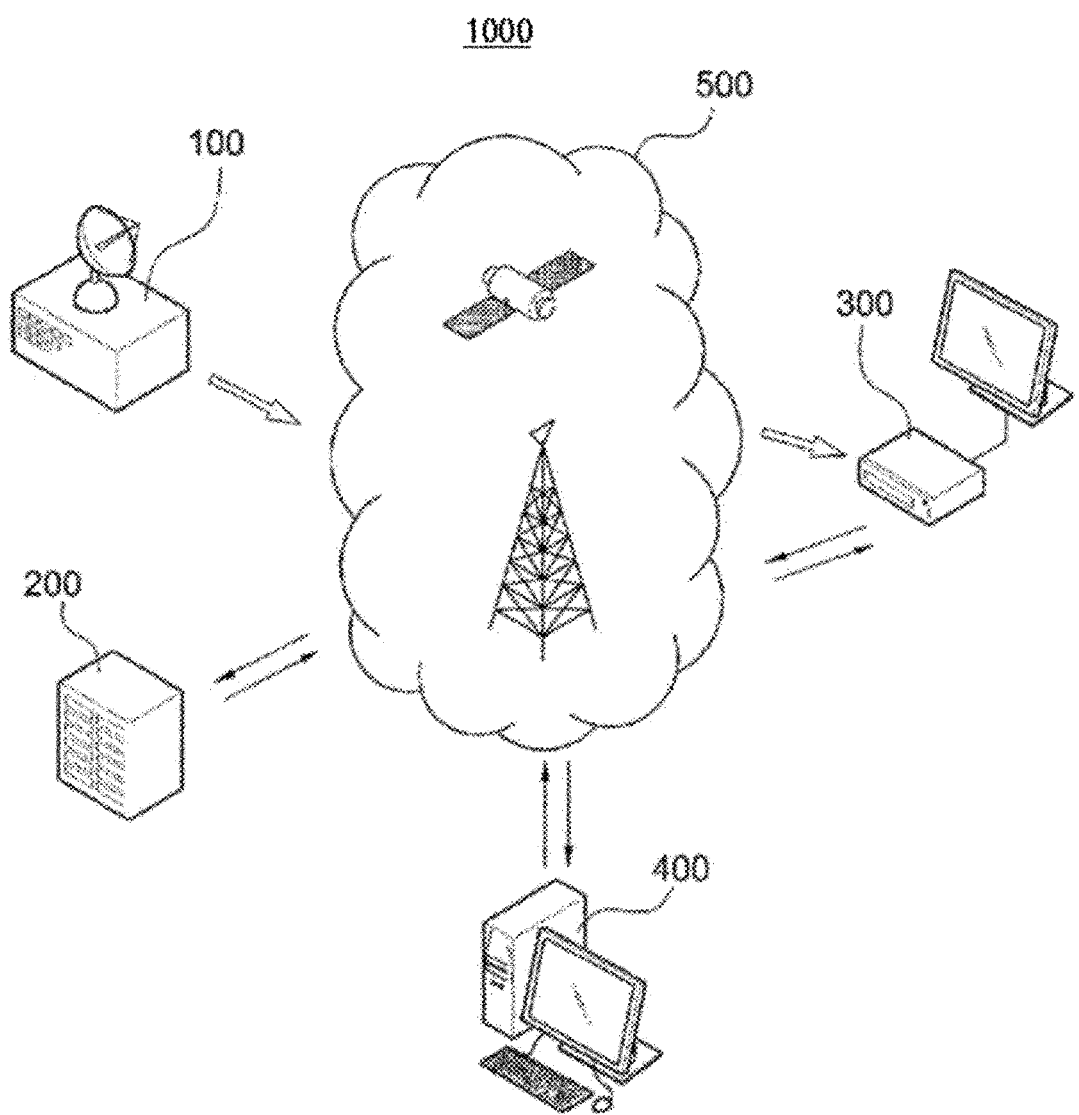
FIG. 1 is a diagram showing a moving image zapping advertisement providing system according to one embodiment of the disclosure.

Some preferred embodiments of the disclosure will be described in detail below with reference to the attached drawings to clarify the technical idea of the disclosure. In describing the disclosure, detailed descriptions of related known functions or components will be omitted when it is considered as unnecessarily making the subject matter of the disclosure unclear. Elements having substantially the same functional configuration in the figures have been designated with the same reference numerals and symbols as long as it is possible, even if those elements are shown in different figures. An apparatus and a method will be described together for the convenience of description, if necessary.

FIG. 1 is a diagram showing a moving image zapping advertisement providing system according to an embodiment of the disclosure.

Referring to FIG. 1, a moving image zapping advertisement providing system 1000 may include a broadcast contents providing server 100, a zapping advertisement server 200, a broadcast receiving apparatus 300, and an advertiser terminal 400. The moving images zapping advertisement providing system 1000 may be configured with a network 500 to communicate signals with each other.

The broadcast contents providing server 100 may provide various types of digital broadcast contents to the broadcast receiving apparatus 300. The broadcast contents providing server 100 may include a terrestrial broadcasting station, a local cable broadcasting station, an Internet Protocol Television (IPTV) broadcasting station, a satellite broadcasting station, a Video On Demand (VOD) server, an application server, etc.

In one embodiment, the broadcast contents providing server 100 may receive a signal requesting a specific broadcast contents, such as a signal for channel switch, from the broadcast receiving apparatus 300 and transmit broadcast contents information corresponding to the request to the broadcast receiving apparatus 300 via the network 500.

In the process of providing a digital broadcast, processes for the broadcast receiving apparatus 300 to receive compressed data from the broadcast contents providing server 100, to decompress the compressed data, and to display the decompressed data on the screen are inevitably involved, and a time delay associated with signal processing must occur accordingly. In the specification, a time difference generated according to the broadcast reception process is referred to as a channel changing time, and such channel changing time may be noticeable in a broadcast contents changing process. For example, when watching the broadcast contents continuously on a single broadcast channel, the processes of receiving, releasing, processing, and the like of the broadcast contents are continued based on a delayed channel changing time, and thereby the inconvenience associated with the channel changing time is small. However, when watching one broadcast content and subsequently watching another broadcast content, for example, when changing the channels, no broadcast content may be displayed during the channel changing time caused by processing of the corresponding broadcast contents. The disclosure utilizes the fact that there is no broadcast content displayed during the channel changing time, and makes a zapping advertisement to be exposed on the user's screen. Preferably, a moving image zapping advertisement is exposed on the user's screen.

The zapping advertisement server 200 may transmit zapping advertisements to be exposed during the channel switching time to the broadcast receiving apparatus 300. The zapping advertisements exposed during the channel switching time include advertisements for contents, enterprises, products, services, etc. In one embodiment, the zapping advertisements may be provided in the form of keywords, graphical images, sounds, etc., and here the moving image zapping advertisement is described as being provided in the form of a moving image. In the disclosure, the zapping advertisement server 200 may provide various and specific additional information through the moving image zapping advertisements during the channel switching time.

The zapping advertisement server 200 may store schedule information for a moving image zapping advertisement which is scheduled for each channel of the digital broadcast and the moving image zapping advertisement required for the moving image zapping advertisement scheduling, and transmit periodically the moving image zapping advertisement schedule to the broadcast receiving apparatus 300 depending on the embodiments. In one embodiment, the zapping advertisement server 200 may transmit the moving image zapping advertisements to the broadcast receiving apparatus 300 through streaming. In addition, the zapping advertisement server 200 may perform functions of receiving requests for zapping advertisements from advertisers and calculating costs for the zapping advertisements to charge the advertisers for advertising costs.

The broadcast receiving apparatus 300 may receive various types of digital broadcast contents from the broadcast contents providing server 100 and display them on a screen, and receive zapping advertisements from the zapping advertisement server 200 and display them.

The broadcast receiving apparatus 300 may include a set top box for receiving terrestrial, satellite, or cable broadcast, a TV with a set top box function built in, an internet based IPTV, and a digital device equipped with a receiving module for digital multimedia broadcasting (DMB) or digital video broadcasting-handheld (DVB-H) such as a mobile phone, a smartphone, a notebook, a tablet PC, a Personal Multimedia Player (PMP), navigation, etc.

In one embodiment, the broadcast receiving apparatus 300 may receive a moving image zapping advertisement from the zapping advertisement server 200 through streaming and display the received advertisement on a screen. Since the moving image zapping advertisement is received through streaming, the broadcast receiving apparatus 300 may display the moving image zapping advertisement in real time without storing it.

The advertiser terminal 400 is a terminal device to which an advertiser who desires for a zapping advertisement may access, and the advertiser may access to the zapping advertisement server 200 via the advertiser terminal 400 to request for a zapping advertisement. The advertiser terminal 400 may determine a channel on which the zapping advertisement is provided, a time window during which the zapping advertisement is provided, an exchange period of the zapping advertisements, etc. and request for the zapping advertisement on the zapping advertisements request page provided by the zapping advertisement server 200. Depending on the embodiments, the advertiser terminal 400 may include an Internet-accessible electronic device including a personal computer.

The zapping advertisement server 200 may map a specific advertisement, a channel, and a time window during which advertisements are provided, etc. based on a zapping advertisement request of the advertiser terminal 400 to generate zapping advertisement schedule information. In one embodiment, the moving image zapping advertisement may generate the moving image zapping advertisement schedule information individually for each channel of the digital broadcast. According to one embodiment, the zapping advertisement schedule information and the moving image zapping advertisement schedule information may be stored in the zapping advertisement server 200 or transmitted to the broadcast receiving apparatus 300 at a predetermined cycle.

The network 500 is a wired or wireless communication network such as a terrestrial network, a satellite network, a cable network, and an Internet network, and mediates communications between the broadcast contents providing server 100 and the broadcast receiving apparatus 300, the zapping advertisement server 200 and the broadcast receiving apparatus 300, and the zapping advertisement server 200 and the advertiser terminal 400. The broadcast contents providing server 100 may transmit a broadcast content to the broadcast receiving apparatus 300 via the network 500, the zapping advertisement server 200 may transmit a moving image zapping advertisement and/or a zapping advertisement to the broadcast receiving apparatus 300, and the advertiser terminal 400 may request a zapping advertisement to the zapping advertisement server 200 via the network 500.

Figure 2:
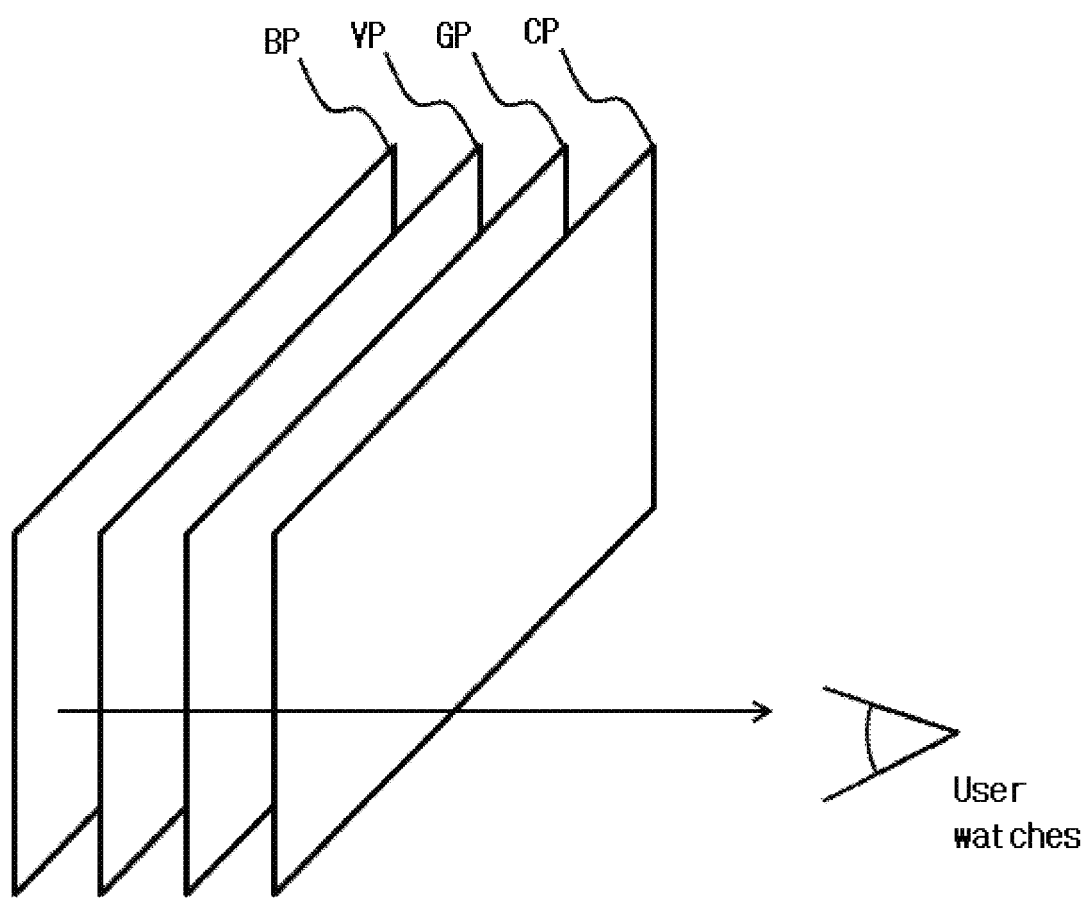
FIG. 2 is a conceptual diagram for explaining a layer structure applied to a digital display screen.

FIG. 2 is a conceptual diagram for explaining a layer structure applied to a digital display screen.

Referring to FIG. 2, a digital display screen may be implemented with a plurality of planes BP, VP, GP, and CP. Each of the planes has a logically specific function, and each plane has a vertical priority order (hierarchy). That is, the planes have a priority order in which each plane is logically viewed, and the user watches a screen in which all the planes are vertically overlaid and displayed.

A background plane BP is a plane that is logically arranged at the most bottom part and statically shows a decoded video or image. The background plane BP generally supports specific formats only such as MPEG-2 i-frame (defined in ISO/IEC 13818-2) and JPEG (Joint Photographic Experts Group, defined in ISO/ICE 10918-1).

A video plane VP is a plane on which decoded video is displayed and from which a broadcast content is output. According to one embodiment, a moving image zapping advertisement may be output on the video plane VP. According to another embodiment, a digital display screen may include a plurality of video planes VP, and a plurality of videos may be decoded and displayed on each plane.

According to an embodiment, a chip supporting a Picture-In-Picture (PIP) function may simultaneously display a small screen which is separate from the screen viewed on the display screen, in which case a plurality of videos may be simultaneously decoded and displayed to the user.

A graphics plane GP is a plane that displays graphics or text-based information, and at least one or more graphics planes GP may be included. In addition, the graphics plane GP may support various colors and resolutions. For example, the graphics plane GP may be used to display various applications (VOD, etc.), channel numbers, program information, electronic program guides (EPG), and the like which are provided by the broadcast receiving apparatus 300.

The graphics plane GP is displayed in a higher priority than the video plane and the background plane BP, and the information displayed on the graphics plane GP may be displayed while covering the screen of the video plane VP with a portion for displaying corresponding information.

According to one embodiment, the digital display screen may further include a cursor plane CP. The cursor plane CP is a plane used to display a cursor, which is input through a hardware, on a screen, and the cursor plane may not be provided in a typical System on Chip (SoC) for TV.

Although the relationship between the plurality of planes is represented as being arranged in a logically lower portion, the plane arranged in a logically upper portion covers the plane arranged in a logically lower portion, when visually observed, and, thus, the background plane BP may be represented as being arranged at the backside of the video plane VP, the graphics plane GP, and the cursor plane CP.

Also, in this case, the cursor plane CP may be represented as being arranged on the upper surface of the other planes BP, VP, GP.

The disclosure is explained based on that the broadcast receiving apparatus 300 provides a display screen including, among a plurality of planes, a video plane VP on which a broadcast content and a moving image zapping advertisement are displayed and a background plane BP on which a zapping advertisement is displayed. However, the disclosure is not limited to these two planes, and it is sufficient as long as a broadcast content and a zapping advertisement are displayed logically above and below of each other so that the zapping advertisement is concealed when the broadcast content or a moving image zapping advertisement is displayed and exposed when the broadcast content or the moving image zapping advertisement is not displayed.

According to one embodiment, the information displayed on the plurality of planes may be mixed in the broadcast receiving apparatus 300, and may be transmitted and received as one signal.

Figure 3:
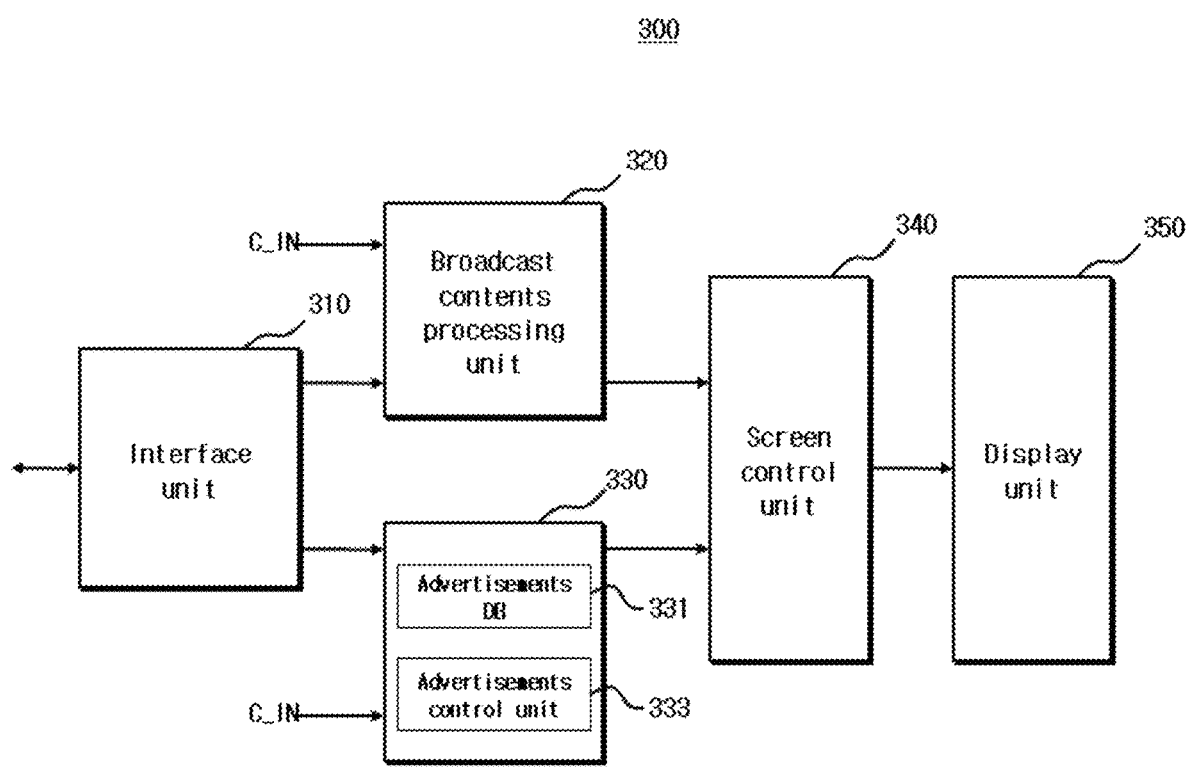
FIG. 3 is a block diagram showing a broadcast receiving apparatus according to one embodiment of the disclosure.

FIG. 3 is a block diagram showing a broadcast receiving apparatus according to one embodiment of the disclosure.

Referring to FIGS. 1 and 3, the broadcast receiving apparatus 300 may include an interface unit 310, a broadcast contents processing unit 320, a zapping advertisement processing unit 330, a screen control unit 340, and a display unit 350.

The interface unit 310 may receive broadcast contents information from the broadcast contents providing server 100, and may receive moving image zapping advertisements and moving image zapping advertisement schedule information from the zapping advertisement server 200. Here, the broadcast contents information may include broadcast contents video, age limit information of broadcast contents, and the like. The moving image zapping advertisement schedule information may include advertisers of moving image zapping advertisements, broadcast channels on which the moving image zapping advertisements are scheduled, log information of the moving image zapping advertisements, and the like. According to one embodiment, the interface unit 310 may receive zapping advertisements and zapping advertisements schedule information. Here, the non-moving-image zapping advertisements schedule information may include an image in the zapping advertisement itself, an advertiser of the zapping advertisement, a broadcast channel on which the zapping advertisement should be provided, a time window during which the zapping advertisement is provided, a validity period of the zapping advertisement, and the like.

The interface unit 310 may convert the broadcast contents information and the zapping advertisements information into a form that is processable by the broadcast receiving apparatus 300, and provide the converted information to the broadcast contents processing unit 320 and the zapping advertisements processing unit 330, respectively.

The broadcast contents processing unit 320 may perform operations such as decoding broadcast contents information and converting the same to a resolution suitable for display. The broadcast contents processing unit 320 may provide broadcast content images to the screen control unit 340 to display the images on the video plane, and provide information for displaying broadcast information other than images such as subtitles to the screen control units 340 to display such information on the graphics plane.

In addition, the broadcast contents processing unit 320 may display broadcast contents on a plurality of video planes, and since the broadcast contents are generally provided in real time in a stream form, the broadcast contents processing unit 320 may decode the broadcast contents in real-time and provide them to the screen control unit 340 corresponding to the video planes.

According to one embodiment, once receiving a channel switching signal C_IN, the broadcast contents processing unit 320 may receive broadcast contents of the switched channel, not the broadcast contents of the previously set channel. In response to the channel switching signal C_IN, the broadcast contents processing unit 320 may request broadcast contents of the switched channel to the broadcast contents providing server 100 via the interface unit 310, and once receiving the requested broadcast contents, the broadcast contents processing unit may provide such received broadcast contents to the screen control unit 340 so as to display the broadcast contents of the switched channel on a first plane. The first plane may be a video plane.

Upon receiving the channel switching signal C_IN, the zapping advertisements processing unit 330 may request a moving image zapping advertisement corresponding to the switched channel from the zapping advertisements server 200, and provide the received moving image zapping advertisement to the screen control unit 340 to display the same on the first plane via streaming Here, the first plane may be a video plane.

The zapping advertisements processing unit 330 may include an advertisements DB 331 and an advertisement control unit 333.

The advertisements DB 331 may store zapping advertisement information and zapping advertisements schedule information. Further, the advertisements DB 331 may store different moving image zapping advertisements schedule information. Here, the moving image zapping advertisements schedule information may include an advertiser of the moving image zapping advertisement, a broadcast channel in which a moving image zapping advertisement is scheduled, log information of the moving image zapping advertisement, and the like.

In response to the channel switching signal C_IN, the advertisements control unit 333 may request the zapping advertisement server 200 through the interface unit 310 for a moving image zapping advertisement corresponding to the switched channel, and provide the received moving image zapping advertisement to the screen control unit 340 for display on the first plane. The first plane may be a video plane.

In one embodiment, the advertisements control unit 333 may check the moving image zapping advertisements schedule information, and request, if the moving image zapping advertisement is scheduled on the switched channel as a result of checking, the zapping advertising server 200 for a moving image zapping advertisement corresponding to the switched channel through the interface unit 310. Accordingly, the received moving image zapping advertisement may be provided to the screen control unit 340 for display on the video plane via streaming.

Further, the advertisements control unit 333 may make the zapping advertisement to be displayed on the second plane according to the zapping advertisements schedule information. Here, the second plane may be a background plane. The zapping advertisements schedule information may include an advertiser of the above-mentioned zapping advertisement, a broadcast channel on which the zapping advertisement is to be provided, an advertisement time window during which the zapping advertisement is provided, a validity period of the zapping advertisement, and the like. The advertisements control unit 333 may store the received zapping advertisement information in the advertisements DB 331, and may receive information from the advertisement database 331 and process the same whenever necessary.

The advertisements control unit 333 provides a zapping advertisement to the screen control unit 340 to display the same on the background plane based on the zapping advertisement information, and changes the zapping advertisement if necessary. Changing the zapping advertisements may be performed based on the zapping advertisements schedule information.

Further, the advertisements control unit 333 may identify the time for which the zapping advertisement is actually exposed and monitor the result of providing the zapping advertisement. According to one embodiment, the channel switching signal C_IN is provided while a specific zapping advertisement is being displayed, and when the channel switching is completed, it may be considered that the zapping advertisement displayed in the background plane is provided to the user. Therefore, the advertisements control unit 333 may monitor the exposure time for each zapping advertisement to generate a zapping advertisement provision result and use the result in calculating the advertisement costs.

The screen control unit 340 processes the information received from the broadcast contents processing unit 320 and the zapping advertisements processing unit 330 in association with each plane, and provides an output screen in which all planes are mixed based on the vertical priority order of each plane.

In one embodiment, the screen control unit 340 may make the broadcast contents of the switched channel to be displayed on the video plane after the moving image zapping advertisement is finished to provide the output screen. Accordingly, the broadcast contents of the switched channel may be displayed as sequentially provided at the same time when the moving image zapping advertisement is finished on the screen.

On the other hand, according to one embodiment, when a signal for skipping the moving image zapping advertisement is received via the interface unit 310, the screen control unit 340 may stop the moving image zapping advertisement being provided and make the broadcast contents of the switched channel to be displayed on the video plane to provide the output screen. In this way, on the screen, it may be displayed as the moving image zapping advertisement is interrupted and the broadcast contents of the switched channel is provided.

When the moving image zapping advertisement is finished, the screen control unit 340 may transmit the log information of the finished moving image zapping advertisement to the zapping advertisements server 200 via the interface unit 310. Here, the log information of the finished moving image zapping advertisement may include the number of times of playback of the moving image zapping advertisement corresponding to the switched channel. The number of times of playback of the moving image zapping advertisement is information based on the moving image zapping advertisement schedule information, and with this information the exposure of the moving image zapping advertisement may be monitored. Accordingly, it is possible to prevent excessive exposure of the moving image zapping advertisement to the user and to provide the moving image zapping advertisement efficiently.

According to one embodiment, the broadcast receiving apparatus 300 may further include a display unit 350.

The display unit 350 may have an input/output function, and may include a flat panel using LCD, PDP, OLED, UHD, FED, or the like.

The display unit 350 may be implemented exterior of the interface unit 310, the broadcast contents processing unit 320, the zapping advertisements processing unit 330, and the screen control unit 340, or may be integrally implemented.

Figure 4:
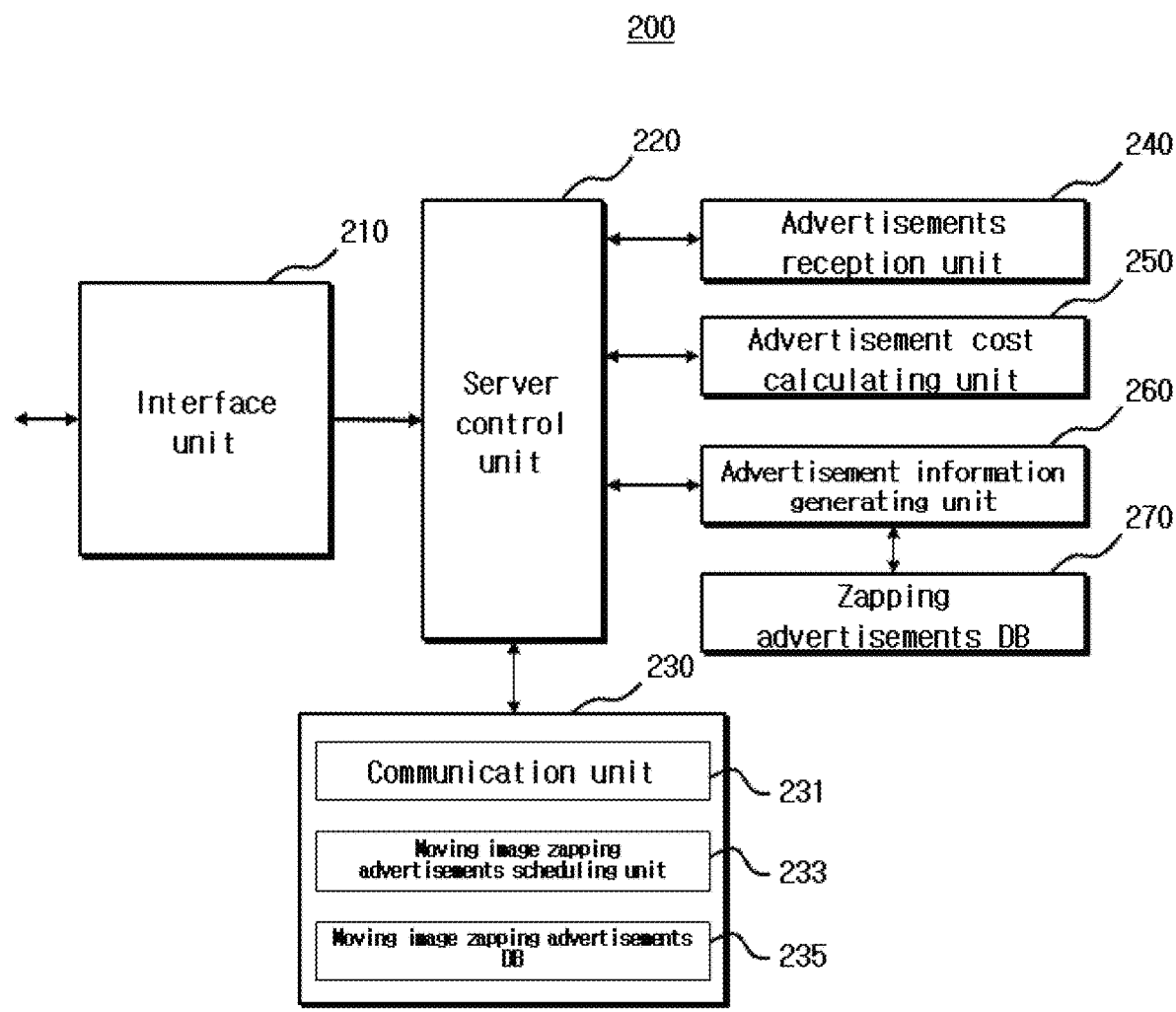
FIG. 4 is a block diagram showing a zapping advertisement server according to one embodiment of the disclosure.

FIG. 4 is a block diagram illustrating a zapping advertisements server according to one embodiment of the disclosure.

Referring to FIGS. 1 and 4, the zapping advertisements server 200 may receive a request for a zapping advertisement to be provided during the channel switching time from the advertiser terminal 400, generate zapping advertisement information, and provide the same to the broadcast receiving apparatus 300.

The zapping advertisements server 200 may include an interface unit 210, a server control unit 220, a moving image zapping advertisement processing unit 230, an advertisements reception unit 240, an advertisement cost calculating unit 250, an advertisement information generating unit 260, and a zapping advertisements DB 270.

The interface unit 210 may convert the information received from the advertiser terminal 400 or the broadcast receiving apparatus 300 into a form suitable for the zapping advertisements server 200, or into a form suitable for the advertiser terminal 400 or the broadcast receiving apparatus 300, and provide the converted information.

The server control unit 220 may control overall operations of the zapping advertisements server.

When a request according to a channel switching signal is received, the moving image zapping advertisements processing unit 230 may transmit a moving image zapping advertisement corresponding to a switched channel via streaming according to the moving image zapping advertisements schedule information. The moving image zapping advertisements processing unit 230 may be implemented inside the zapping advertisements server 200 as transmitting the moving image zapping advertisements to the broadcast receiving apparatus 300 in real time, but if the load to the server is increased, the moving image zapping advertisements processing unit may implemented outside of the zapping advertisement servers 200 in the form of a separate streaming server.

The moving image zapping advertisements processing unit 230 may include a communication unit 231, a moving image zapping advertisement scheduling unit 233, and a moving image zapping advertisements DB 235.

The communication unit 231 may receive a request according to the channel switching signal from the broadcast receiving apparatus 300, and transmit the moving image zapping advertisement via streaming in response to the request. Also, the communication unit 231 may receive the log information of the moving image zapping advertisements from the broadcast receiving apparatus 300.

The moving image zapping advertisements scheduling unit 233 may organize and monitor the moving image zapping advertisements for each channel of the digital broadcast. The moving image zapping advertisements scheduling unit 233 may reschedule the moving image zapping advertisements according to the log information of the moving image zapping advertisements, and re-transmit the rescheduled moving image zapping advertisements schedule information to the broadcast receiving apparatus 300.

The moving image zapping advertisements DB 235 may store moving image zapping advertisements to provide the same during the channel switching time of the digital broadcast. For a moving image zapping advertisement, it is configured in a large capacity format such as MPEG4, MOV, AVI, WMV, MPEGPS, FLV, 3GPP, WebM, DNxHR, ProRes, CineForm, HEVC (h265), and the like, and thus the moving image zapping advertisement may be managed and stored separately from the zapping advertisements DB 270.

The advertisements reception unit 240 receives the requests for the zapping advertisements and the moving image zapping advertisements from the advertiser terminal 400. The application of the zapping advertisements may include information about the broadcast channel, time window, regional area, etc., on which, during which, and to which the zapping advertisement should be provided. The information received through the advertisement reception unit 240 may be provided to the advertisements information generating unit 260 and become the basis for generating zapping advertisements information.

The advertisement cost calculation unit 250 may calculate the advertisement cost based on the result the zapping advertisement provision provided from the broadcast receiving apparatus 300, and charge the advertiser terminal 400 with the advertisement cost. The advertisement cost may be calculated based on the cost per exposure time of the channel switching advertisement or may be obtained by adding an additional cost for extra exposure times to the standard cost for predetermined exposure times.

The zapping advertisements DB 270 stores zapping advertisement information. Although the advertisements DB 331 stores zapping advertisements, a larger amount of information may be stored in the zapping advertisements DB 270 because there may be a limit in storage capacity in the advertisements DB. Therefore, the disclosure may effectively provide various additional information to the advertisement for a short period of time by providing a moving image zapping advertisement to maximize the advertising effect of the advertiser.

Figure 5:
FIGS. 5 to 7 are views conceptually showing an output screen provided by a broadcast receiving apparatus according to one embodiment of the disclosure.
Figure 6:
Figure 7:
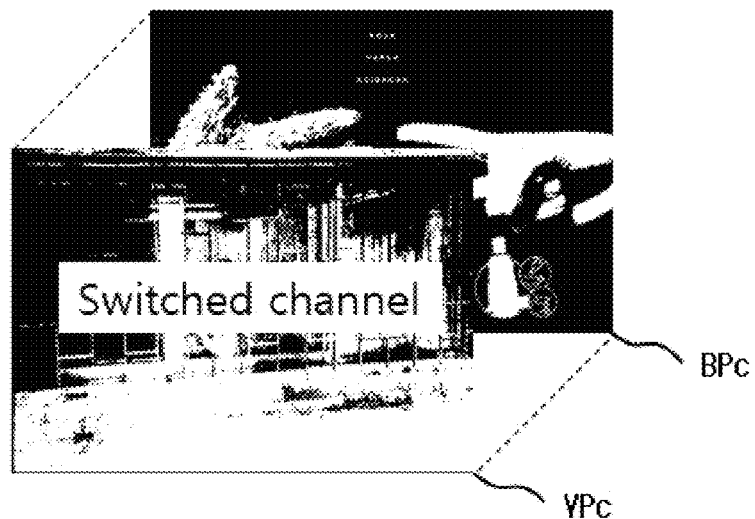

FIGS. 5 to 7 are views conceptually showing an output screen provided by the broadcast receiving apparatus according to one embodiment of the disclosure.

FIG. 5 shows a normal watching situation in which a zapping advertisement is being displayed on the background plane BPa and the broadcast contents of a previously set channel is being provided in the video plane VPa.

Referring to FIG. 5, since the broadcast content is being provided on the video plane VPa, the zapping advertisement displayed on the background plane BPa is not exposed, and what is visually recognized is the same as if only the broadcast contents are provided on the video plane VPa.

FIG. 6 is a view showing a period during which the broadcast contents previously having been provided on the video plane VPb are not received, the broadcast contents of the switched channel are requested, and the broadcast contents are being received and processed in response to a channel switching signal.

Referring to FIG. 6, since the moving image zapping advertisement is being provided via streaming to the video plane VPb in response to the channel switching signal, it is possible to display the moving image zapping advertisement first before displaying the broadcast contents of the switched channel.

At this time, an input signal may be displayed on the graphics plane GPb to enable skipping of the moving image zapping advertisement.

Even in this case, the zapping advertisement is being provided on the background plane BPb, but since the moving image zapping advertisement is being provided on the video plane VPb, the zapping advertisement may not be exposed.

FIG. 7 is a view illustrating a case where the broadcast contents of the switched channel is received and processed in response to the channel switching signal and actually displayed on the video plane VBc.

When the broadcast contents of the switched channel are provided, the broadcast contents of the switched channel covers the zapping advertisement on the background plane BPc similarly to the previous step.

Referring to FIGS. 5 to 7, there is a visual effect such that the moving image zapping advertisement appears and then disappears before the broadcast contents of the switched channel is displayed on the video planes VPa, VPb, and VPc.

Figure 8:
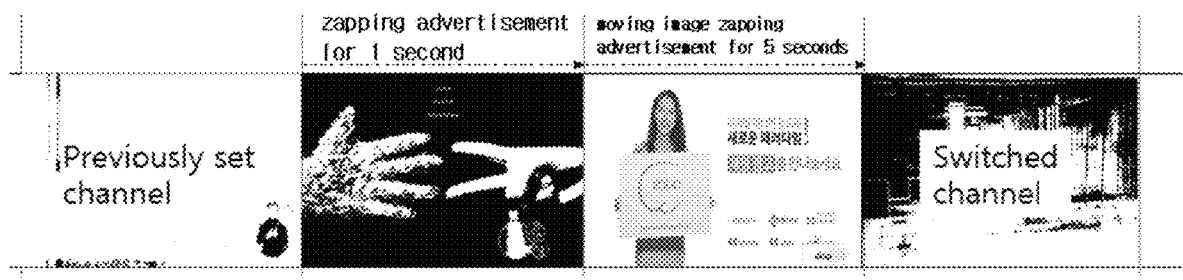
FIG. 8 is a view conceptually showing an output screen provided by a broadcast receiving apparatus according to another embodiment of the disclosure.

FIG. 8 is a view conceptually showing an output screen provided by a broadcast receiving apparatus according to another embodiment of the disclosure.

Referring to FIGS. 3 and 8, when the channel switching signal C_IN is received at the time of providing the broadcast content of the previously set channel, at least some time may be required to receive the moving image zapping advertisement via streaming and display the moving image zapping advertisement on the video plane, and since no information is provided on the video plane during the channel switching time, the video plane is projected as itself as a black screen, the zapping advertisement displayed on the background plane may be displayed during the above channel switching time.

In the broadcast receiving apparatus 300 according to one embodiment of the disclosure, the zapping advertisements processing unit 330 may keep displaying a zapping advertisement on the background plane BP. Since the background plane BP is covered while the broadcast content is provided on the video plane VP, even if a zapping advertisement is displayed on the background plane, the background plane BP will not affect the provision of the broadcast contents at all.

Upon receiving the channel switching signal C_IN at the time of providing the broadcast contents of the previously set channel, the broadcast receiving apparatus 300 may provide the zapping advertisement on the background plane BP for a first time period (e.g., one second) until receiving the moving image zapping advertisement information from the zapping advertisements server 200 via streaming and providing the moving image zapping advertisement on the screen.

Then, when the preparation for displaying the moving image zapping advertisement via streaming is completed, the moving image zapping advertisement is provided on the video plane VP for a second time period (e.g., 5 seconds), and then the broadcast contents of the switched channel are provided. For this purpose, a process of buffering of the broadcast contents of the switched channel which is already started being received while the moving image zapping advertisement is being provided may be required.

On the other hand, depending on the embodiments, when the signal for skipping the moving image zapping advertisement is received, the moving image zapping advertisement may stop being provided and the broadcast contents of the switched channel which is in a process of buffering may be provided.

Therefore, since the broadcast receiving apparatus 300 according to one embodiment of the disclosure may provide a zapping advertisement during the channel switching time and may provide the moving image zapping advertising just before the broadcast contents of the switched channel is provided, various different advertisement effects may be enhanced. In other words, the broadcast receiving apparatus 300 according to one embodiment of the disclosure may further provide a moving image zapping advertisement by randomly adjusting the zapping time.

When the channel is changed according to the channel switching signal and the viewer starts watching another channel, the nature of the broadcast contents that has been provided immediately before also change. For example, the advertising effect may be maximized if a moving image zapping advertisement targeted for the viewers watching news or a moving picture zapping advertisement targeted for viewers watching movies is provided.

In addition, according to one embodiment, the viewer does not necessarily have to watch the moving image zapping advertisement, and may skip the moving image zapping advertisement in the middle of the advertisement being displayed. In this way, the channel switching time may be secured and the broadcast contents may be output immediately, so that the moving image zapping advertisement may be provided without a sense of discomfort to the viewer.

According to an embodiment, the moving image zapping advertisement may be scheduled in association with the broadcast contents of the channel that the viewer is watching through the broadcast receiving apparatus 300, and even if the broadcast receiving apparatus 300 receives the channel switching signal, if the viewer is switching the channels continuously, it may be considered as the channels are simply moved by the viewer, and thus one moving image zapping advertisement already scheduled for the switched channel may be displayed on the display unit 350 until the end.

According to another embodiment, when the broadcast receiving apparatus 300 continuously receives the channel switching signal, the moving image zapping advertisements corresponding to the switched channels may be received in real time and sequentially provided. In this case, the viewer may be provided with moving image zapping advertisements for various channels. According to one embodiment, when the viewer inputs a channel switching signal to another channel again while the moving image zapping advertisement is provided, the moving image zapping advertisement that was being displayed on the display unit 350 may be ended. In addition, as another embodiment, the broadcast receiving apparatus 300 may ignore the channel switching signal which is input from the viewer during the playback time of the moving image zapping advertisement.

Figure 9:
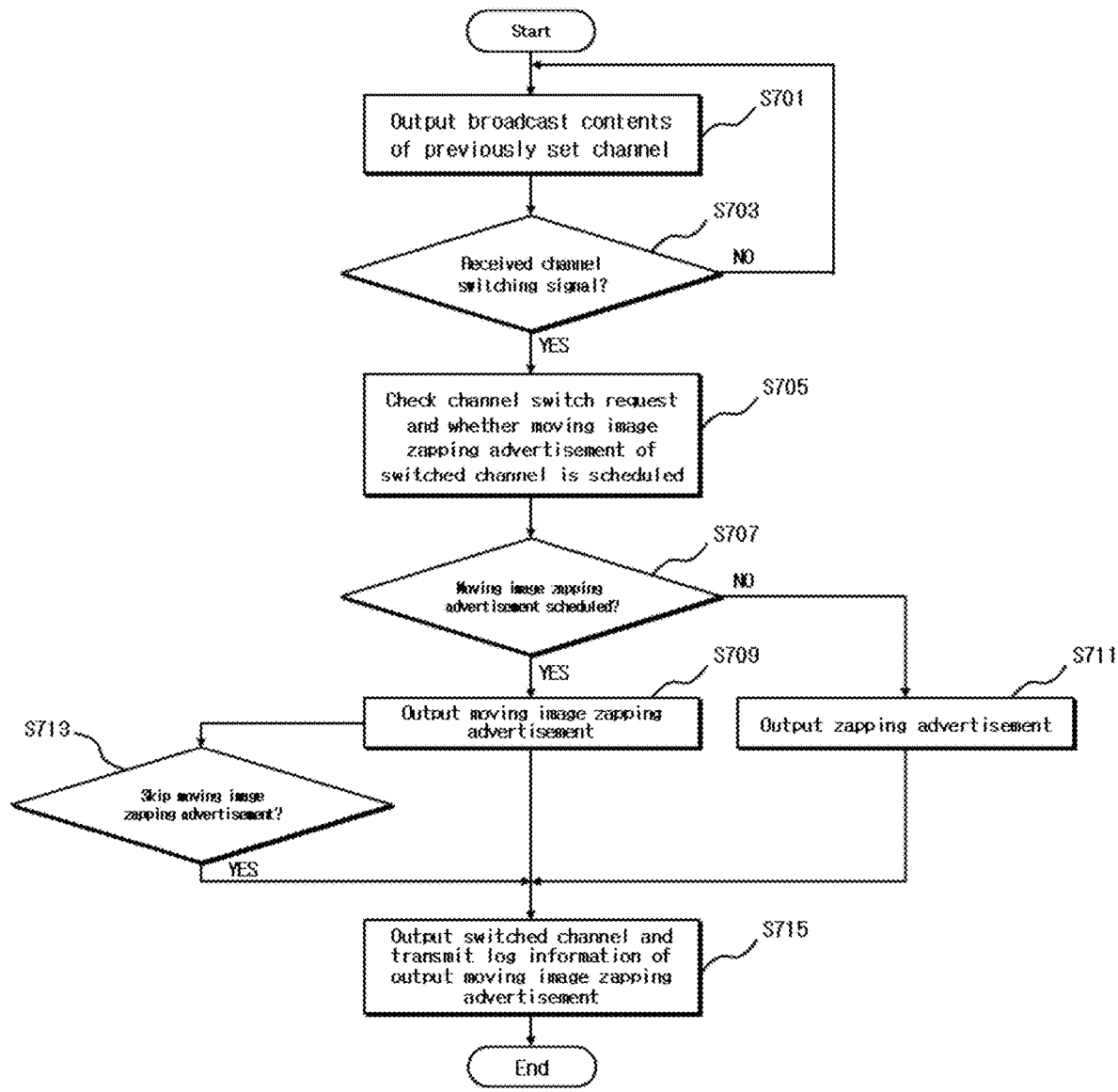
FIG. 9 is a flow chart for explaining a method for providing a moving image zapping advertisement in a broadcast receiving apparatus according to one embodiment of the disclosure.

FIG. 9 is a flowchart for explaining a method for providing a moving image zapping advertisement in a broadcast receiving apparatus according to one embodiment of the disclosure.

Referring to FIGS. 3 and 9, if, when the broadcast receiving apparatus 300 is outputting broadcast contents of a previously set channel to the first plane (S701), a channel switching signal is received (S703: YES), the broadcast contents processing unit 320 requests broadcast contents of the switched channel from a broadcast contents providing server 100, and the zapping advertisements processing unit 330 may check the moving image zapping advertisement schedule information stored in the advertisements DB 331 (S705). If a channel switching signal is not received (S703: NO), the broadcast contents of the previously set channel may continue to be output.

If the zapping advertisements processing unit 330 determines that the moving image zapping advertisement corresponding to the switched channel is scheduled as a result of checking the moving image zapping advertisement schedule information stored in the advertisements DB 331 (S707: YES), zapping advertisements processing unit may request the moving image zapping advertisement corresponding to the switched channel from the zapping advertisements server 200.

The zapping advertisements processing unit 330 may output the moving image zapping advertisements received from the zapping advertisements server 200 via streaming on the first plane (S709). The screen control unit 340 may make the broadcast contents of the switched channel to be output on the first plane after the moving image zapping advertisement being output via streaming is finished (S713). Then, the display unit 350 may display the broadcast contents of the switched channel after the moving image zapping advertisement is completed. Thereafter, the broadcast receiving apparatus 300 may transmit the log information of the finished moving image zapping advertisement to the zapping advertisements server 200 (S713).

Meanwhile, if a signal for skipping the moving image zapping advertisement is received while the moving image zapping advertisement is being output (S711; YES), the screen control unit 340 may stop the moving image zapping advertisement from being output in the first plane via streaming and display the broadcast contents of the switched channel to be output in the first plane (S715). The display unit 350 may stop the moving image zapping advertisement and display the broadcast contents of the switched channel.

Meanwhile, the zapping advertisements processing unit 330 may check the moving image zapping advertisements schedule information stored in the advertisements DB 331 (S705), and if the moving image zapping advertisement corresponding to the switched channel is not scheduled as a result of the check (S707: NO), the zapping advertisements processing unit 330 may output the broadcast contents of the switched channel immediately without outputting the moving image zapping advertisement (S713). In other words, the zapping advertisements server 200 and the broadcast receiving apparatus 300 according to one embodiment of the disclosure have an effect of comparing the moving image zapping advertisements schedule information with the information of the switched channel, and selectively providing the moving image zapping advertisement only for the channel in which the moving image zapping advertisement is scheduled.

According to an embodiment, as described with reference to FIG. 9, a zapping advertisement in the form of a still image may be displayed on the background plane for a short time before a moving image zapping advertisement is received via streaming. The moving image zapping advertisement may then be displayed in the video plane via streaming, and the broadcast contents of the switched channel may be displayed after the moving image zapping advertisement is finished.

Hereby, the disclosure may deliver more additional information in a short time and increase advertising profit by providing not only a general zapping advertisement but also a moving image zapping advertisement during the channel switching time. In addition, if a viewer does not wish to watch the moving image zapping advertisement, the viewer may skip the moving image zapping advertisement and watch the broadcast contents of the switched channel immediately. Although the channel switching time is short, by providing a moving image zapping advertisement during such time, it is possible to use the time meaningfully.

Figure 10:
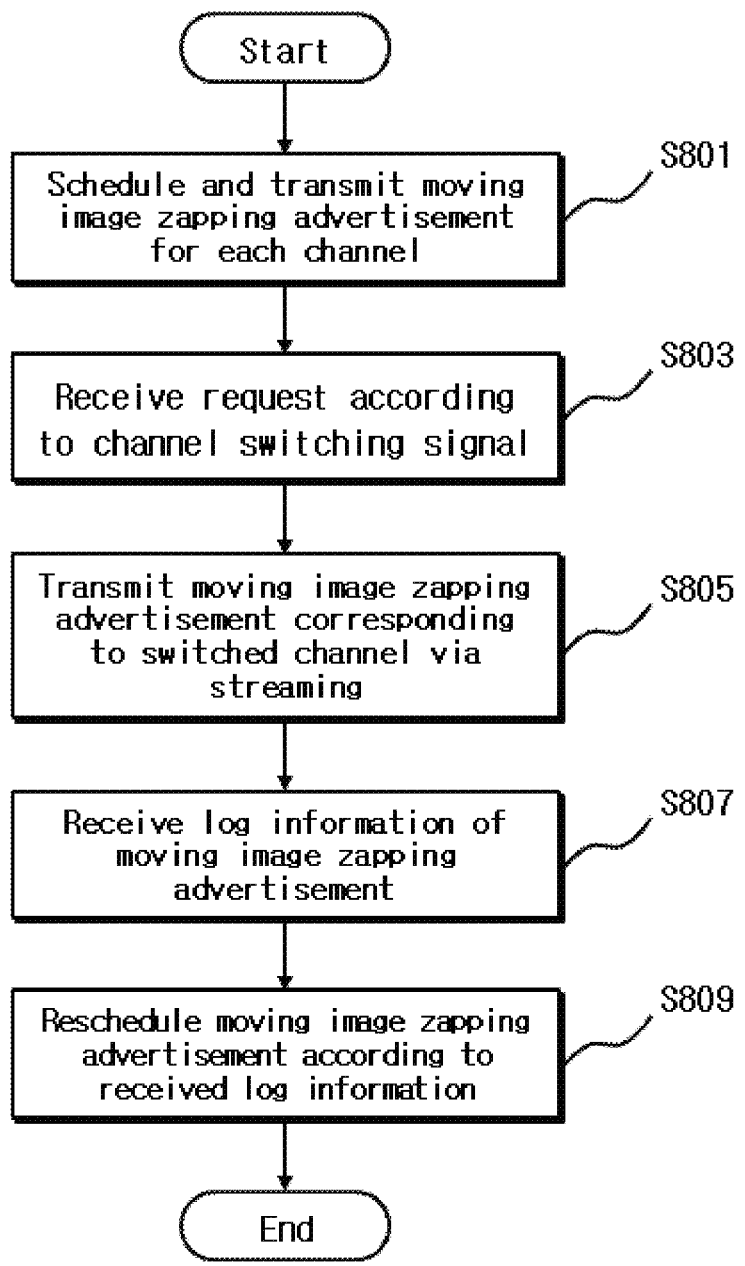
FIG. 10 is a flow chart for explaining the operation of a zapping advertisement server according to one embodiment of the disclosure.

FIG. 10 is a flowchart for explaining the operation of the zapping advertisements server according to one embodiment of the disclosure.

Referring to FIGS. 4 and 10, the moving image zapping advertisements scheduling unit 233 may schedule and monitor the moving image zapping advertisements for each channel of the digital broadcast. In this process, the composed moving image zapping advertisement schedule information may be transmitted to the broadcast receiving apparatus 300 at a predetermined cycle (S801). When a request according to the channel switching signal is received (S803), the moving image zapping advertisement corresponding to the switched channel stored in the moving image zapping advertisements DB 235 may be transmitted via streaming to the broadcast receiving apparatus 300 via the communication unit 231 (S805). Subsequently, when the log information of the moving image zapping advertisement is received from the broadcast receiving apparatus 300 via the communication unit 231 (S807), the moving image zapping advertisement scheduling unit 233 may reschedule the moving image zapping advertisement schedule information according to the received log information for the moving image zapping advertisement (S809).

The rescheduled moving image zapping advertisement schedule information may be transmitted to the broadcast receiving apparatus 300 via the communication unit 231 at a predetermined cycle.

Accordingly, the zapping advertisements server 200 according to one embodiment of the disclosure may efficiently provide zapping advertisements without occupying the memory of the broadcast receiving apparatus by providing moving image zapping advertisements via streaming during the channel switching time.

The disclosure may also be implemented as a computer readable code on a computer readable recording medium. A computer-readable recording medium includes all storage media such as a magnetic storage medium, an optical reading medium, and the like. It is also possible to record the data format of the message used in the disclosure on a recording medium.

The disclosure has been described in detail with reference to the preferred embodiments shown in the drawings. These embodiments are merely for illustration and not intended to limit the disclosure, and should be considered in an illustrative rather than a restrictive sense. The substantial technical scope of the disclosure should be defined by the technical idea of the appended claims rather than the above description. Although specific terms are used herein, they are used solely for the purpose of describing the concepts of the disclosure and are not intended to limit the scope of the disclosure as set forth in the claims or the definitions. Each step of the disclosure does not necessarily need to be carried out in the order described, but may be performed in parallel, alternatively or separately. Those skilled in the art will appreciate that various modifications and equivalent embodiments are possible without departing from the essential spirit of the disclosure as claimed in the claims. It is to be understood that the equivalents include both currently known equivalents as well as equivalents to be developed in the future, i.e., all elements devised to perform the same function, regardless of structure.

What is claimed is:

1. A method of operating a broadcast receiving apparatus comprising a display including a plurality of planes and a process configured to control the display so that different visual information is displayed on the plurality of planes, the method comprising:
displaying a first broadcasting content of a first channel on a first plane;
displaying a first zapping advertisement on a second plane located lower than the first plane;
exposing the first zapping advertisement to a user while receiving a channel switching signal and switching from the first channel to a second channel;
requesting, in response of receiving the channel switching, a second zapping advertisement corresponding to the second channel from a zapping advertisement server and a second broadcasting content of the second channel from a broadcast content server;

blocking exposure of the first zapping advertisement by displaying the second zapping advertisement on the first plane when the second zapping advertisement is received from the zapping advertisement server;

terminating displaying the second zapping advertisement when the second broadcast content is received from the broadcast content server;

displaying the second broadcast content on the first plane, wherein the terminating displaying the second zapping advertisement further comprises:

displaying skip input information for the second zapping advertisement on a third plane located above the first plane;

receiving a skip input signal corresponding to the skip input information from the user; and terminating displaying the second zapping advertisement in response to the skip input signal, and wherein the first zapping advertisement is composed of static image advertisements, and the second zapping advertisement is composed of dynamic image advertisements.

2. The method according to claim 1, wherein the requesting the second zapping advertisement comprises:

checking zapping advertisement schedule information from the zapping advertisement server; and when it is determined that the second zapping advertisement corresponding to the second channel is scheduled as a result of the checking, requesting the second zapping advertisement corresponding to the second channel from the zapping advertisement server.

3. The method according to claim 1, wherein the first plane is a video plane, the second plane is a background plane, and the third plane is a graphics plane.

4. The method according to claim 1, further comprising transmitting log information of the second zapping advertisement to the zapping advertisement server when the second zapping advertisement is terminated.

* * * * *